United States Patent
Funabiki et al.

(10) Patent No.: US 6,916,578 B2
(45) Date of Patent: Jul. 12, 2005

(54) POSITIVE ELECTRODE ACTIVE MATERIAL FOR SECONDARY CELL, METHOD FOR PRODUCING THE SAME AND NONAQUEOUS ELECTROLYTE SECONDARY CELL COMPRISING THE SAME

(75) Inventors: Atsushi Funabiki, Kyoto (JP); Hideo Yasuda, Kyoto (JP)

(73) Assignee: Japan Storage Battery Co., Ltd., Kyoto (JP)

(*) Notice: Subject to any disclaimer, the term of this patent is extended or adjusted under 35 U.S.C. 154(b) by 210 days.

(21) Appl. No.: 10/009,534

(22) PCT Filed: Apr. 16, 2001

(86) PCT No.: PCT/JP01/03223

§ 371 (c)(1),
(2), (4) Date: Dec. 14, 2001

(87) PCT Pub. No.: WO01/80337

PCT Pub. Date: Oct. 25, 2001

(65) Prior Publication Data

US 2002/0192152 A1 Dec. 19, 2002

(30) Foreign Application Priority Data

| Apr. 20, 2000 | (JP) | ................ | 2000-117459 |
| Sep. 1, 2000 | (JP) | ................ | 2000-265870 |
| Nov. 9, 2000 | (JP) | ................ | 2000-342359 |
| Feb. 1, 2001 | (JP) | ................ | 2001-25785 |
| Apr. 5, 2001 | (JP) | ................ | 2001-106822 |
| Apr. 5, 2001 | (JP) | ................ | 2001-106992 |

(51) Int. Cl.$^7$ .................................................. H01M 4/52
(52) U.S. Cl. .................. 429/231.1; 429/221; 429/218.1
(58) Field of Search ...................... 429/218.1, 231.1, 429/221

(56) References Cited

U.S. PATENT DOCUMENTS

| 5,340,671 A | 8/1994 | Koksbang |
| 5,358,801 A | 10/1994 | Brodd |
| 5,389,472 A | 2/1995 | Takeuchi et al. |
| 5,567,548 A | 10/1996 | Walk et al. |
| 5,686,203 A | 11/1997 | Idota et al. |
| 5,698,338 A | 12/1997 | Barker et al. |

(Continued)

FOREIGN PATENT DOCUMENTS

| EP | 0 837 037 A1 | 4/1998 |
| JP | 10-233212 | 9/1998 |
| JP | 10-233215 | 9/1998 |
| JP | 10-233215 A | * 9/1998 |

OTHER PUBLICATIONS

Amine et al.,"Beta–FeOOH, a new positive electrode material for lithium secondary batteries", Journal of Power Sources, 81–82 (Sep. 2000) 221–223.*

(Continued)

Primary Examiner—Carol Chaney
(74) Attorney, Agent, or Firm—Sughrue Mion, PLLC

(57) ABSTRACT

The positive active material for a secondary battery of the present invention is β-FeOOH containing at least one element selected from the group consisting of B, P, S, Li, Na, K, Mg, Al, Ca, Sc, Ti, V, Cr, Mn, Co, Ni, Cu, Zn, Zr, Pb and Sn which shows a diffraction peak from the (110) plane having a half width Y satisfying $0.3° < Y (2\theta)$ when subjected to the X-ray diffractometry with the CuKα ray. A non-aqueous electrolyte secondary battery comprising as a positive active material such low-crystalline β-FeOOH exhibits an excellent cycle life performance as compared with a non-aqueous electrolyte secondary battery comprising a high-crystalline β-FeOOH as a positive active material.

9 Claims, 11 Drawing Sheets

U.S. PATENT DOCUMENTS

| | | | |
|---|---|---|---|
| 5,700,598 | A | 12/1997 | Denis et al. |
| 6,004,697 | A | 12/1999 | Thackeray et al. |
| 6,013,391 | A | 1/2000 | Le et al. |
| 6,083,474 | A * | 7/2000 | Nakamura et al. ....... 252/519.1 |
| 6,174,623 | B1 | 1/2001 | Shackle |
| 6,270,925 | B1 * | 8/2001 | Takada et al. ............ 429/231.1 |
| 6,383,235 | B1 * | 5/2002 | Maegawa et al. .......... 29/623.5 |
| 6,503,646 | B1 | 1/2003 | Ghantous et al. |
| 6,555,272 | B2 | 4/2003 | Suzuki et al. |
| 2002/0009642 | A1 * | 1/2002 | Funabiki ..................... 429/221 |

OTHER PUBLICATIONS

Merriam–Webster Online Dictionary http://www.m–w.com/cgi–bin/dictionary?book=Dictionary&va=amorphous&x=13&y=13.*

Shreir et al., Corrosion, Butterworth, Heinemann, 2000, Table 21.8.*

Hayashibara M et al: "Lithiation characteristics of FeVO4", Solid State Ionics, North Holland Pub. Company, Amsterdam, NL. vol. 98, No. 1–2, Jun. 1, 1997, pp. 119–125.

Saidi M Y et al: Investigation of the electrochemical properties of FexV205:, Solid State Ionics, North Holland Pub. Company, NL, vol. 82, No. 3, Dec. 1, 1995, pp. 203–207.

Suguwara M. and AL.: "Amorphous iron orthovanadate as cathode active materials for rechargeable lithium cells". Denki Kagaku, vol. 61, No. 2, Feb. 1993, pp. 224–227.

Poizot et al: "Low temperature synthesis and electrochemical performance of crystallized FeVO4 1,1H2O", Solid State Ionics, (2000), pp. 31–40.

Amine, et al. "β–FeOOH, a new positive electrode material for lithium secondary batteries". Journal of Power Sources. vol. 81–82, pp. 221–223. (1999).

International Search Report.

* cited by examiner-

POSITIVE ELECTRODE ACTIVE MATERIAL FOR SECONDARY CELL, METHOD FOR PRODUCING THE SAME AND NONAQUEOUS ELECTROLYTE SECONDARY CELL COMPRISING THE SAME

TECHNICAL FIELD

The present invention relates to a positive active material for a secondary battery, a process for the preparation thereof and a non-aqueous electrolyte secondary battery comprising the same.

BACKGROUND ART

As a positive electrode for the non-aqueous electrolyte secondary battery, there has been proposed a lithium-transition metal oxide. As negative electrodes for the non-aqueous electrolyte secondary battery, there has been proposed graphite, amorphous carbon, oxide, lithium alloy and metallic lithium. Nowadays, lithium cobaltate ($LiCoO_2$) is mainly used as a positive active material. However, this active material is expensive. Accordingly, in order to cope with the expected huge consumption of non-aqueous electrolyte secondary batteries, development of less expensive positive active materials is important.

Further, from the view point of the increasing interest in environmental issues, it is quite desirable that the active material is as environmentally friendly as possible. Nowadays, compounds containing manganese, nickel or iron are under extensive studies as the positive active materials for the non-aqueous electrolyte secondary battery. Among these elements, iron is the most inexpensive and environmentally friendly material. Thus, an iron compound is very attractive as a positive active material for the next-generation non-aqueous electrolyte secondary battery.

Various iron compounds have been heretofore proposed as iron-containing positive active materials for the non-aqueous electrolyte secondary battery. Among these iron compounds, iron oxyhydroxide (FeOOH), which is an active material delivering high capacity, has recently attracted much attention. Among several types of FeOOH with different crystalline structure, β-FeOOH has a relatively large size of tunnel structure of (2×2). It is expected that the use of β-FeOOH as a positive active material for the non-aqueous electrolyte secondary battery would provide good battery properties.

Amine et al. investigated the positive-electrode characteristics in the secondary lithium cells using high-crystalline β-FeOOH as a positive material. They reported that this active material exhibited an excellent charge-discharge characteristics at a low current density of 0.1 $mA/cm^2$ (J. Power Sources, 81–82, 221 (1999)). However, the conventional high-crystalline β-FeOOH has a drawback of poor cycle-life performance at a higher current density.

An object of the present invention is to provide an inexpensive and environmentally friendly non-aqueous electrolyte secondary battery by using an unknown novel iron compound as a positive active material.

DISCLOSURE OF THE INVENTION

The positive active material of the invention is β-FeOOH comprising at least one element selected from the group consisting of B, P, S, Li, Na, K, Mg, Al, Ca, Sc, Ti, V, Cr, Mn, Co, Ni, Cu, Zn, Zr, Pb and Sn, which shows a diffraction peak from the (110) plane having a half width Y satisfying 0.3°<Y (2θ) when subjected to X-ray diffractometry with the CuKα ray. Defining that a material having a half width of not greater than 0.3° on the (110) peak is a high-crystalline material while a material having a half width of greater than 0.3° on the (110) peak is an amorphous material, β-FeOOH of the present invention is an amorphous one. The low-crystalline β-FeOOH shows a good cycle-life performance as compared with the high-crystalline one. Although this phenomenon has not been clearly understood, it is considered that B, P, S, Li, Na, K, Mg, Al, Ca, Sc, Ti, V, Cr, Mn, Co, Ni, Cu, Zn, Zr, Pb and Sn act as a column in the active material, resulting in the stabilization of the amorphous structure. The reason why the half width Y on the (110) peak is restricted to the above defined range is that if the half width falls below this range, the active material becomes a high-crystalline compound, thus causing the poor cycle-life performance as mentioned before.

This positive active material is obtainable by adding a salt containing at least one element selected from the group consisting of B, P, S, Li, Na, K, Mg, Al, Ca, Sc, Ti, V, Cr, Mn, Co, Ni, Cu, Zn, Zr, Pb and Sn to an aqueous solution in which an iron salt is dissolved, and then subjecting the resulting aqueous solution to hydrolysis at a temperature of from 40° C. to 100° C. The aqueous solution used for the hydrolysis is preferably an acidic aqueous solution, particularly a hydrochloric acid solution.

In the case where the iron salt is ferric chloride ($FeCl_3$) and the vanadium salt is $VOSO_4$, when an aqueous solution containing $FeCl_3$ and $VOSO_4$ dissolved therein at a molar ratio satisfying 0<($VOSO_4/FeCl_3$)<0.1 is subjected to hydrolysis at a temperature in the range of from 40° C. to 100° C., aged for 1 day or longer, filtered, rinsed, and then dried, a positive active material of the present invention involving vanadium is prepared. The reason why the molar ratio of $VOSO_4$ to $FeCl_3$ is restricted to the above defined range is that the molar ratio exceeding the above defined range gives a compound having a structure different from that of β-FeOOH.

Further, since the high-crystalline β-FeOOH is a needle-like crystal having a great aspect ratio, the use of this material as an active material provides a reduced contact area between the particles. Accordingly, a large amount of an electrically-conducting agent is required to improve the electrical conductivity between the particles. As a result, the number of the active material per unit volume within an electrode is lowered, which is disadvantage.

On the contrary, in accordance with the present invention which uses an amorphous β-FeOOH having a particle with an aspect ratio of not greater than 5, the particles can be packed densely, resulting in the improvement of the contact between the particles. Accordingly, the amount of the electrically-conducting agent to be added can be reduced, resulting in the increase in the number of the active material per unit volume within an electrode. Further, since the contact area between the particles is large, good contact between the particles can be maintained even if the crystal lattice of the active material expands or shrinks. When the amorphous β-FeOOH having such properties is used as a positive active material for an non-aqueous electrolyte secondary battery, the cycle-life performance of the resulting electrode can be remarkably improved as compared with the conventional electrode having the high-crystalline β-FeOOH.

The amorphous β-FeOOH of the present invention may be in the form of primary particle or agglomerate of primary particles as long as the aspect ratio of particles having each form is not greater than 5. As long as the aspect ratio of the agglomerate is not greater than 5, the aspect ratio of the constituent primary particles may be not smaller than 5. Specific examples of the crystal form of β-FeOH of the present invention include column, cone, and rod.

The foregoing aspect ratio means the mean aspect ratio of individual particles. In some detail, 50 particles which are selected at random are observed under the microscope. The average of the aspect ratios of the individual particles thus determined is defined as the aspect ratio of active material particles. Accordingly, an active material having an aspect ratio of not greater than 5 means that the average aspect ratio of the constituent particles is not greater than 5.

The aspect ratio of individual particles indicates the degree of the slenderness of β-FeOOH particles, i.e., the ratio of (longer axis length/shorter axis length) of the particles. As the aspect ratio increases, the particle becomes slender. In particular, when the aspect ratio of the particle is not greater than 2, the electrode comprising the β-FeOOH exhibits a remarkably improved cycle-like performance.

Furthermore, the inventors made studies on the particle diameter of the amorphous β-FeOOH and its charge-discharge characteristics. As a result, it was found for the first time that a non-aqueous electrolyte secondary battery, comprising, as a positive active material, an amorphous β-FeOOH having a particle with a mode diameter of not greater than 10 μm and showing a diffraction peak from the (110) plane having a half width Y satisfying $0.3°<Y (2\theta)$ when subjected to X-ray diffractometry with the CuKα ray exhibits an excellent cycle-life performance.

It is necessary that the mode diameter of this amorphous β-FeOOH particle is not greater than 10 μm, preferably not greater than 6 μm. The reason why the mode diameter is restricted to not greater than 10 μm is that, when the mode diameter is greater than this range, the active material exhibits a remarkably poor cycle-life performance. The term "mode diameter" as used herein means the maximum value on the particle-size distribution curve, i.e., the diameter of particles which are contained mostly in the powder, which is represented by $D_{mod}$ (Kiichiro Kubo, "Funtai-Riron to Ouyou (Powder—Theory and Application)", Maruzen, 1979).

The particle may be in the form of primary particle, agglomerate of primary particle or mixture thereof. The mode diameter of primary particles or their agglomerate may be not greater than 10 μm. In the case where the positive active material of the present invention is used in a non-aqueous electrolyte secondary battery, an agglomerate is preferred as the active material rather than primary particles. The reason is that the use of an agglomerate as an active material makes it possible to reduce the amount of the electrically-conducting agent in the positive electrode, resulting in the further enhancement of the energy density of the battery.

When the amorphous β-FeOOH of the invention is used as a positive active material for a secondary lithium battery, the insertion/extraction of lithium occurs, resulting in the reduction of the crystallinity of the active material and a drastic change of the structure. The amorphous β-FeOOH of the present invention which has been charged and discharged shows new diffraction peaks at angles of about 19°, 26° and 32° when subjected to X-ray diffractometry with the CuKα ray. Then, the incorporation of at least one element selected from the group consisting of Li, Na, K, Mg, Al, Ca, Sc, Ti, V, Cr, Mn, Co, Ni, Cu, Zn, Zr, Pb and Sn in advance in the amorphous β-FeOOH makes it possible to improve the cycle-life performance of the battery. This is presumably because those elements act as columns in the crystal, exerting an effect of stabilizing the amorphous structure.

Further, it is necessary that the amount of the foregoing element sin the amorphous β-FeOOH of the invention is not smaller than 0.1 wt %. When the amount of these elements is not smaller than 0.1 wt %, the resulting cycle-life performance is remarkably improved. However, even when these elements are added in an amount exceeding the predetermined value, the improvement of the cycle-life performance is not observed. On the contrary, when the amount of these elements involved in the amorphous β-FeOOH increases, the discharge capacity decreases. Accordingly, the amount of these elements is preferably not smaller than 0.1 wt % but is as small as possible.

BEST MODE FOR CARRYING OUT THE INVENTION

Preferred embodiments of the present invention will be described hereinafter.

An example of the process for the preparation of an amorphous β-FeOOH of the present invention is explained as follows. It is obtained by adding a salt containing at least one element selected from the group consisting of B, P, S, Li, Na, K, Mg, Al, Ca, Sc, T, V, Cr, Mn, Co, Ni, Cu, Zn, Zr, Pb and Sn to an aqueous solution in which an iron salt dissolved, and subjecting the resulting solution to hydrolysis at a temperature of from 40° C. to 100° C. The aqueous solution used for the hydrolysis is preferably an acidic aqueous solution, particularly a hydrochloric acid solution. As the salt to be added, a sulfate is particularly preferred. The reason why a sulfate is particularly preferred is that the use of a sulfate makes it possible to remarkably enhance the yield. It is preferred that the product obtained by the hydrolysis is aged for 1 day or longer, filtered, rinsed, and dried. This preparation process is extremely simple and very excellent as an industrial process.

Examples of the iron salt to be used in the process for the preparation of the positive active material of the present invention include FeO, $Fe_2O_3$, $Fe_3O_4$, $FeBr_2$, $FeBr_3$, $FeCl_2$, $FeCl_3$, $Fe(NO_3)_3$, $Fe_3(PO_4)_2$, $FePO_4$, $FeSO_4$, $Fe_2(SO_4)_3$, $Fe_2(C_2O_4)$, $(NH_4)_2Fe(SO_4)_2$, and $(NH_4)Fe(SO_4)_2$. Examples of the salt containing B, P, S, Li, Na, K, Mg, Al, Ca, Sc, Ti, V, Cr, Mn, Co, Ni, Cu, Zn, Zr, Pb, or Sn include $NaBO_2$, $Na_4B_2O_5$, $Na_2B_4O_7$, $NaB_5O_8$, $Na_2B_6O_{10}$, $Na_2B_8O_{13}$, $Na_2HPO_4$, $Na_2HPO_3$, NaBr, $NaBrO_3$, NaCl, $NaClO_3$, NaI, $NaNO_3$, $Na_3PO_4$, $NaPO_3$, $Na_4P_2O_7$, LiBr, LiCl, LiI, $LiNO_3$, $Li_2SO_4$, $Na_2SO_4$, $Na_2SO_4$, $Na_2S$, NaOH, KBr, $KBrO_3$, $K_2CO_3$, $K_2C_2O_4$, KCl, KI, $KNO_3$, $K_3PO_4$, $K_4P_2O_7$, $KCr(SO_4)_2$, KOH, $K_2S$, $MgBr_2$, $Mg(C_2H_3O_2)_2$, $MgCl_2$, $MgI_2$, $Mg_3(PO_4)_2$, $MgSO_4$, $AlCl_3$, $Al(NO_3)_3$, $Al_2(O_4)_3$, $CaBr_2$, $CaCl_2$, $CaI_2$, $Ca(NO_3)_2$, $ScCl_3$, $Sc_2(SO_4)_3$, $TiBr_4$, $TiCl_4$, $Ti(SO_4)_2$, $TiOSO_4$, $VOCl_3$, $VOSO_4$, $CrBr_3$, $CrCl_3$, $Cr_2(SO_4)_3$, $MnBr_2$, $MnCl_2$, $Mn(NO_3)_2$, $MnSO_4$, $CoBr_2$, $CoCl_2$, $CoI_2$, $Co(NO_3)_2$, $CoSO_4$, $NiBr_2$, $Ni(C_2H_3O_2)_2$, $NiCl_2$, $NiI_2$, $Ni(NO_3)_2$, $NiSO_4$, $CuBr_2$, $Cu(CH_3COO)_2$, $CuCl_2$, $Cu(NO_3)_2$, $CuSO_4$, $ZnBr_2$, $Zn(CH_3COO)_2$, $ZnCl_2$, $ZnI_2$, $Zn(NO_3)_2$, $ZnSO_4$, $ZrCl_4$, $ZrI_4$, $ZrOCl_2$, $Zr(SO_4)_2$, $Pb(CH_3COO)_2$, $Pb(NO_3)_2$, $SnBr_2$, $SnCl_2$, $SnCl_4$, $SnF_2$, $SnF_4$, and $SnSO_4$. These salts may be used in the form of a hydrate and may be used singly, or two or more of these salts may be used in admixture.

Figure 1:
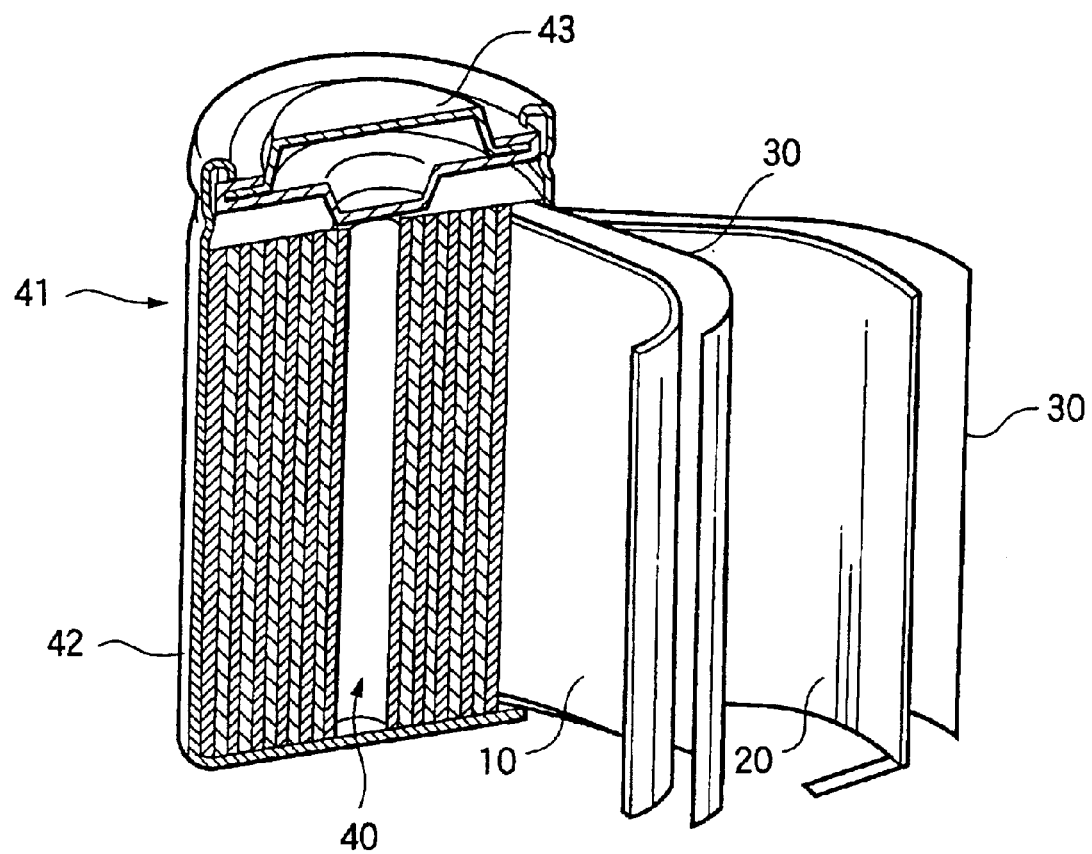
FIG. 1 is an exploded perspective view of a non-aqueous electrolyte secondary battery.
Figure 2:
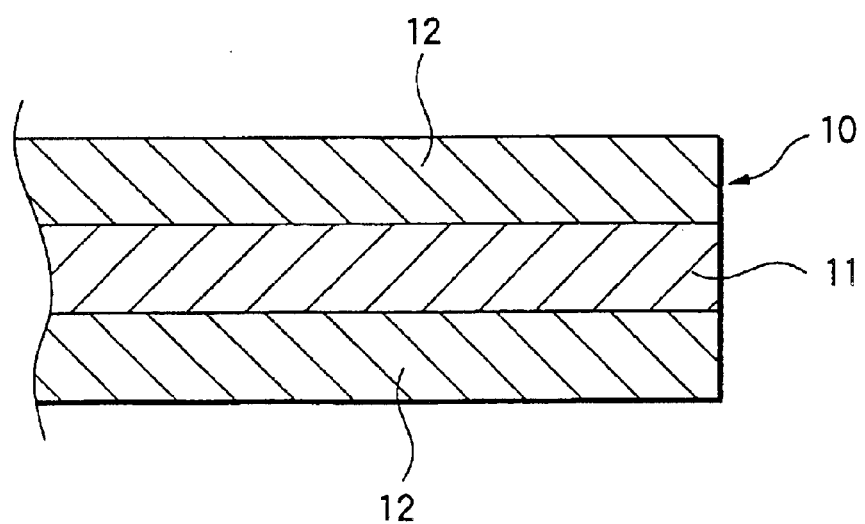
FIG. 2 is an enlarged sectional view of a positive electrode.
Figure 3:
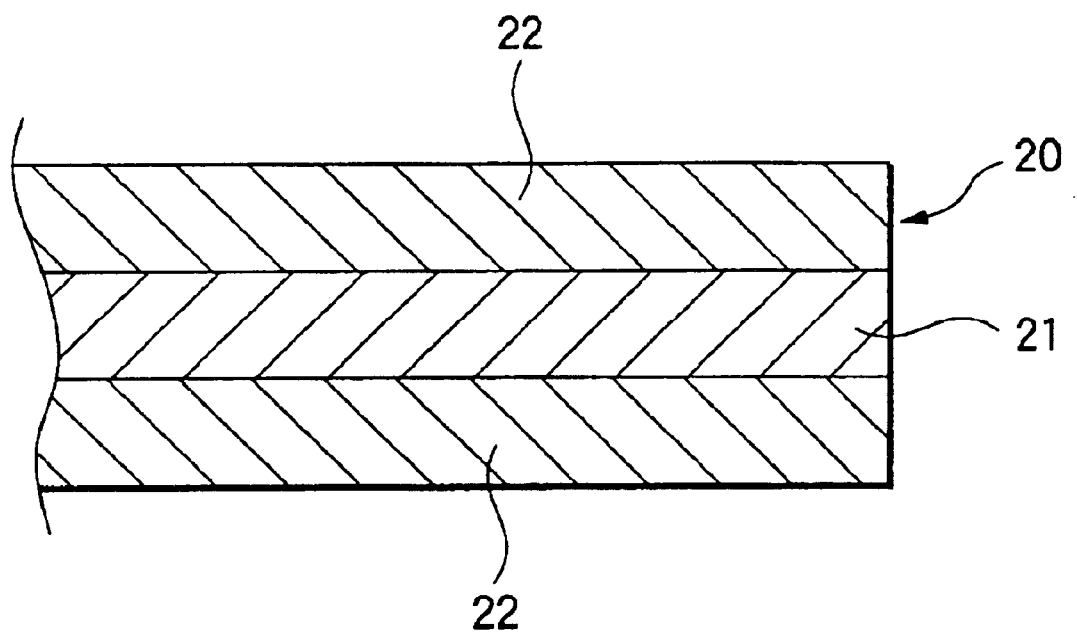
FIG. 3 is an enlarged sectional view of a negative electrode.

When the positive active material of the present invention is used to form a non-aqueous electrolyte secondary battery, structures as shown in FIGS. 1 to 3 may be used. That is, a positive electrode 10 and a negative electrode 20 are spirally wound with a separator 30 of a nonwoven polyethylene fabric therebetween. The spirally laminated electrode element 40 thus obtained is inserted in a battery case 41. The battery case 41 comprises a negative electrode case 42 in the form of cylindrical vessel, and the opening of the cylindrical vessel is closed by a positive electrode cap 43. Though not shown, the interior of the battery case is filled with a liquid non-aqueous electrolyte.

The aforementioned positive electrode 10 has a structure comprising a positive-electrode composite 12 retained on both sides of a current collector 11 of an aluminum foil having a thickness of, for example, 20 μm as shown in FIG. 2. The positive electrode 10 is obtained by adding, for example, a binder or electrically-conducting agent, etc., to a positive active material of the present invention, spreading the resulting paste on both sides of the current collector 11, drying the coated material, and then pressing the dried material. The positive electrode 10 is then cut into a belt having a predetermined width before use. On the other hand, as shown in FIG. 3, the foregoing negative electrode 20 has a structure comprising a negative-electrode composite 22 retained on both sides of a current collector 21 of, e.g., a copper foil. The negative electrode 20 is obtained by mixing a negative active material with a binder, spreading the resulting paste on both sides of the current collector 21, drying this coated material, and then pressing the dried material. The negative electrode 20 is then cut into a belt having a predetermined width before use. The belt-shaped positive and negative electrodes are spirally wound with the foregoing separator 30 therebetween.

As the negative material to be used in the non-aqueous electrolyte secondary battery of the present invention, there may be used a material capable of inserting and extracting lithium ion and/or metallic lithium. Examples of the material capable of inserting and extracting lithium ion include graphites, amorphous carbons, oxides, nitrides, and lithium alloys. Examples of the lithium alloys include alloys of lithium and metals such as aluminum, zinc, bismuth, cadmium, antimony, silicon, lead, and tin.

The non-aqueous electrolyte to be used in the non-aqueous electrolyte secondary battery of the present invention may be in the form of any of a non-aqueous electrolytic solution, a polymer electrolyte and a solid electrolyte. Examples of the solvent to be used in the non-aqueous electrolytic solution include polar solvents such as ethylene carbonate, propylene carbonate, dimethyl carbonate, diethyl carbonate, methyl ethylene carbonate, γ-butyrolactone, sulfolan, dimethyl sulfoxide, acetonitrile, dimethylformamide, dimethylacetamide, 1,2-dimethoxyethane, 1,2-diethoxyethane, tetrahydrofuran, 2-methyltetrahydrofuran, dioxolane and methyl acetate, and mixture thereof. Examples of the solute to be dissolved in the solvent include salts such as $LiPF_6$, $LiBF_4$, $LiAsF_6$, $LiClO_4$, LiSCN, $LiCF_3CO_2$, $LiCF_3SO_3$, $LiN(SO_2CF_3)_2$, $LiN(SO_2CF_2CF_3)_2$, $LiN(COCF_3)_2$ and $LiN(COCF_2CF_3)_2$, and mixture thereof.

The non-aqueous electrolyte secondary cell comprising an amorphous β-FeOOH as a positive active material will be further described in the following Examples.

[EXAMPLE 1]

0.1 mole of $FeCl_3 \cdot 6H_2O$ and 0.0066 mole of $TiBr_4$ were together dissolved in 1 $dm^3$ of water at a temperature of 25° C. Subsequently, this solution was heated at a rate as low as about 10° C./h, and then kept at a temperature of 85° C. for 2 days. The resulting precipitate was filtered, thoroughly washed with distilled water, and then dried at a temperature of 80° C. to obtain a positive active material of the present invention.

Subsequently, to 75 weight percent of the foregoing positive active material were added 20 weight percent of acetylene black and 5 weight percent of poly(vinylidene fluoride) (PVDF). The mixture was then mixed with N-methyl-2-pyrrolidone in a wet process to form a slurry. The slurry thus obtained was then spread on both sides of an aluminum mesh as a current collector. The electrode thus obtained was then dried at a temperature of 80° C. Further, the electrode was pressed at 1 $t/cm^2$, and then dried in vacuo at a temperature of 100° C. to prepare a positive electrode having a size of 15 mm×15 mm×0.5 mm.

Finally, the foregoing positive electrode was used to prepare a cell (A1) of this Example comprising a positive active material of the present invention. The flood-type cell comprises metallic lithium as a negative electrode and a 1:1 (by volume) mixture of ethylene carbonate and dimethyl carbonate having 1 mol/l of $LiClO_4$ dissolved therein as a non-aqueous electrolytic solution.

[EXAMPLE 2]

0.1 mole of $FeCl_3 \cdot 6H_2O$ and 0.0033 mole of $VOSO_4 \cdot 2H_2O$ were together dissolved in 1 $dm^3$ of water at a temperature of 25° C. Subsequently, this aqueous solution was heated at a rate at low at 10° C./h, and then kept at a temperature of 80° C. for 2 days. The resulting precipitate was filtrated, thoroughly washed with distilled water, and then dried at a temperature of 80° C. to obtain a positive active material of the present invention.

Finally, a cell (A2) of this Example was prepared in the same manner as in Example 1 except that the foregoing positive active material was used.

[COMPARATIVE EXAMPLE 1]

0.1 mole of $FeCl_3 \cdot 6H_2O$ were dissolved in 1 $dm^3$ of water at a temperature of 25° C. Subsequently, this aqueous solution was heated at a rate as low as 10° C./h, and then kept at a temperature of 60° C. for 2 days. The resulting precipitate was filtrated, thoroughly washed with distilled water, and then dried at a temperature of 80° C. to obtain a positive active material.

Finally, a comparative cell (B1) was prepared in the same manner as in Example 1 except that the foregoing positive active material was used.

[COMPARATIVE EXAMPLE 2]

0.1 mole of $FeCl_3 \cdot 6H_2O$ and 0.012 mole of $VOSO_4 \cdot 2H_2O$ were together dissolved in 1 $dm^3$ of water at a temperature of 25° C. Subsequently, this aqueous solution was heated at a rate as low as 10° C./h, and then kept at a temperature of 70° C. for 2 days. The resulting precipitate was filtrated, thoroughly washed with distilled water, and then dried at a temperature of 80° C. to obtain a positive active material.

Finally, a comparative cell (B2) was prepared in the same manner as in Example 1 except that the foregoing positive active material was used.

Figure 4:
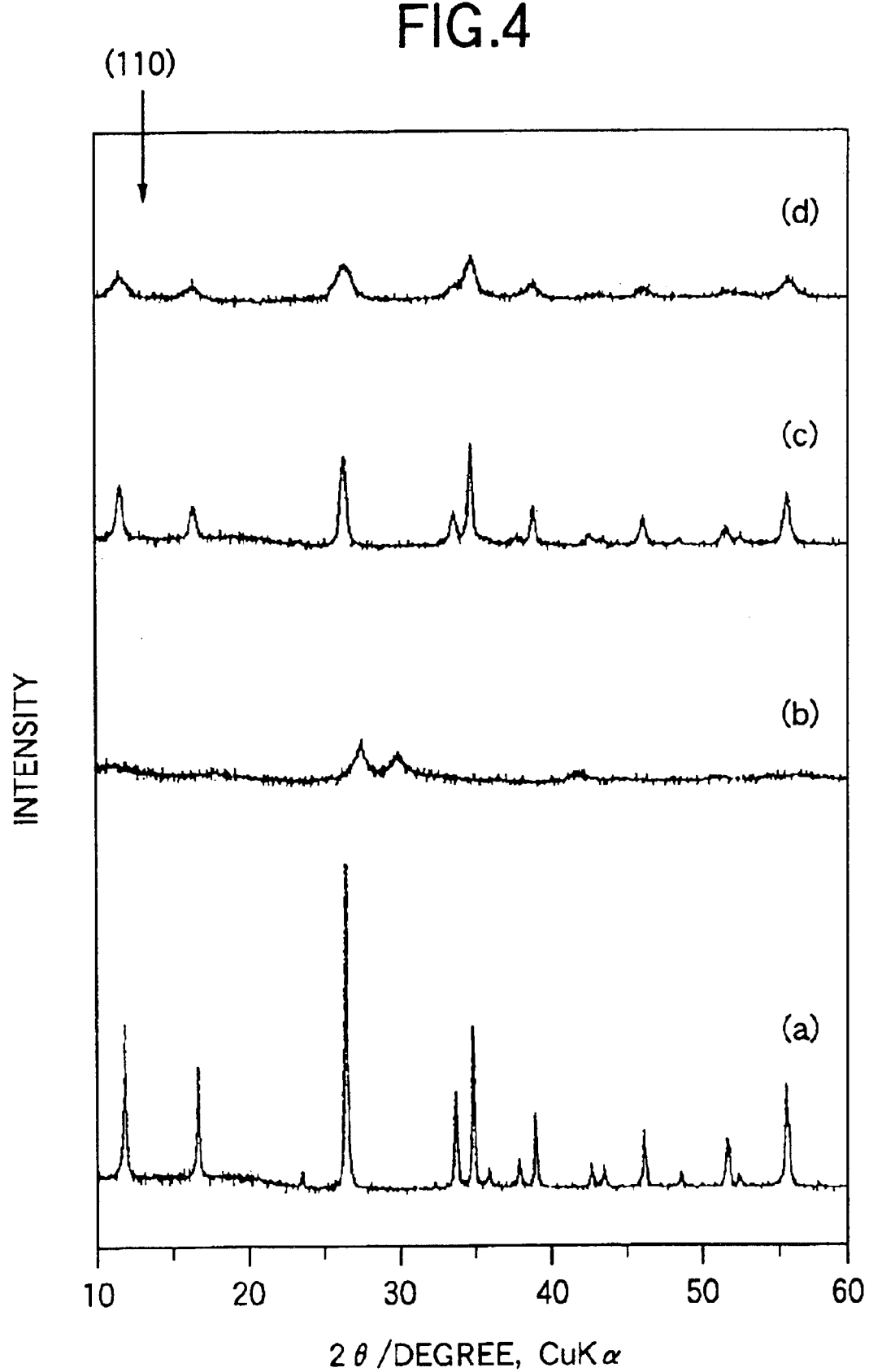
FIG. 4 illustrates X-ray diffraction patterns of the positive active materials used in the batteries A1 and A2 of the Examples and the comparative batteries B1 and B2.

FIGS. 4A, B, C and D indicate X-ray diffraction patterns (the CuKα ray) of the positive active materials used in the comparative cells B1 and B2 and the cells A1 and A2 of the present invention, respectively. From the position of the diffraction peaks, it was found that the active materials used in the cells A1 and A2 of the Examples and the comparative cell B1 were β-FeOOH. On the other hand, the active material used in the comparative cell B2 was found to have a structure quite different from that of β-FeOOH.

The inductivity coupled radio frequency plasma (ICP) spectroscopy revealed that the positive active material used in the cell A1 and that used in the cell A2 of the Examples contained about 3 wt % of Ti and V, respectively. On the other hand, the positive active material used in the comparative cell B2 was found to contain about 25 wt % of V.

Comparing the cell A2 of the Example with the comparative cell B2, the active material used in the former cell was obtained under the condition of $VOSO_4/FeCl_3$ (molar ratio) <0.1 while the active material used in the latter cell was synthesized under the condition of $VOSO_4/FeCl_3$ (molar ratio)>0.1. It was thus found that the hydrolysis of an aqueous solution in which $FeCl_3$ and $VOSO_4$ are dissolved at a molar ratio satisfying $0<(VOSO_4/FeCl_3)<0.1$ makes it possible to obtain an amorphous β-FeOOH of the present invention.

The values of the half width of a diffraction peak from the (110) plane for the active materials used in the cells A1 and A2 of the Examples and the comparative cell B1 were about 0.5°, 1.2°, and 0.2°, respectively. It was thus found that the positive active materials used in the cells A1 and A2 of the Examples and the active material used in the comparative cell B1 were amorphous β-FeOOH and high-crystalline β-FeOOH, respectively.

[Charge-discharge characteristics]

The cells A1 and A2 of the Examples of the comparative cells B1 and B2 thus prepared were each subjected to the 10-cycle charge-discharge test at a constant current. The termination voltages for the charge and discharge were 4.3 V and 1.6 V, respectively.

Figure 5:
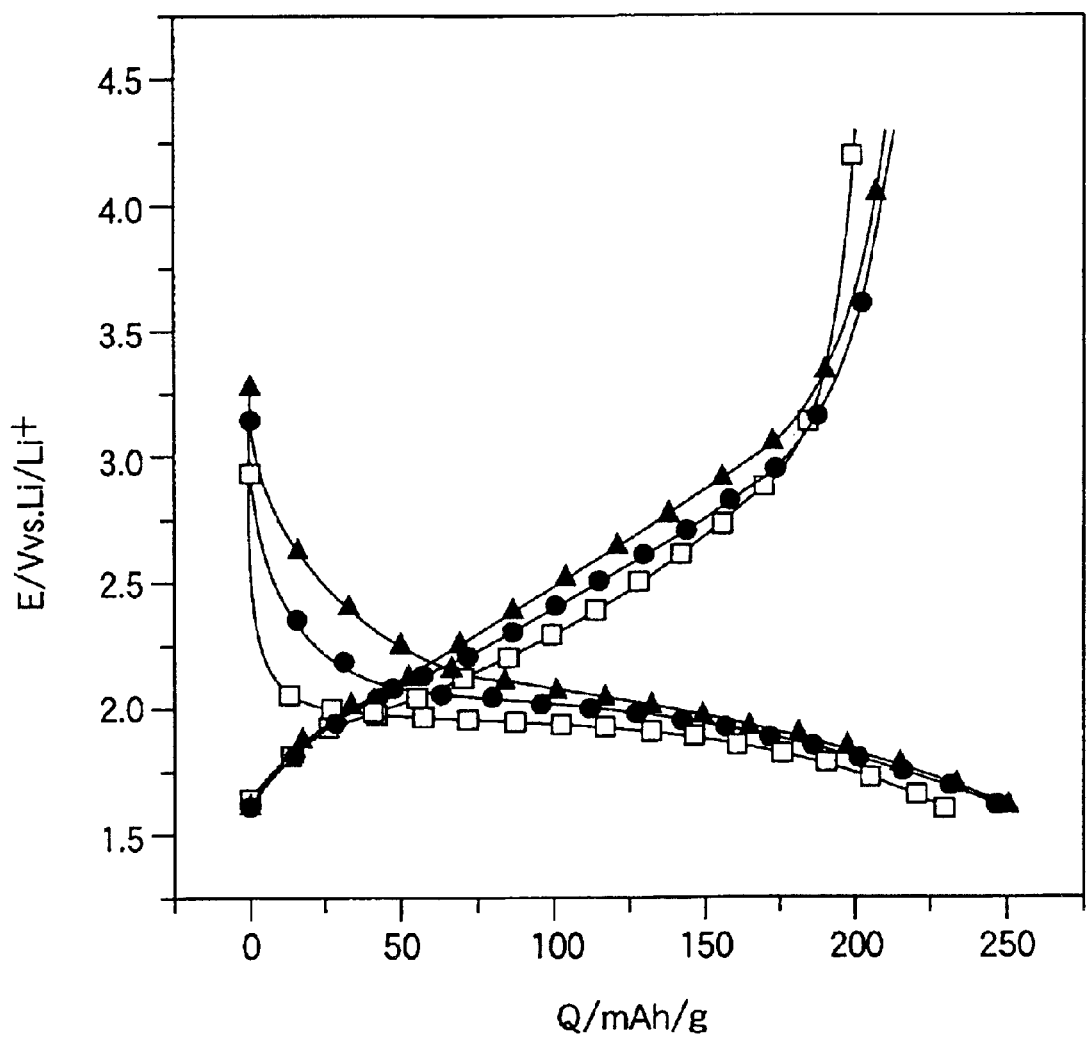
FIG. 5 is a graph of the initial charge-discharge characteristics of the batteries A1 and A2 of the Examples and the comparative battery B1.
Figure 6:
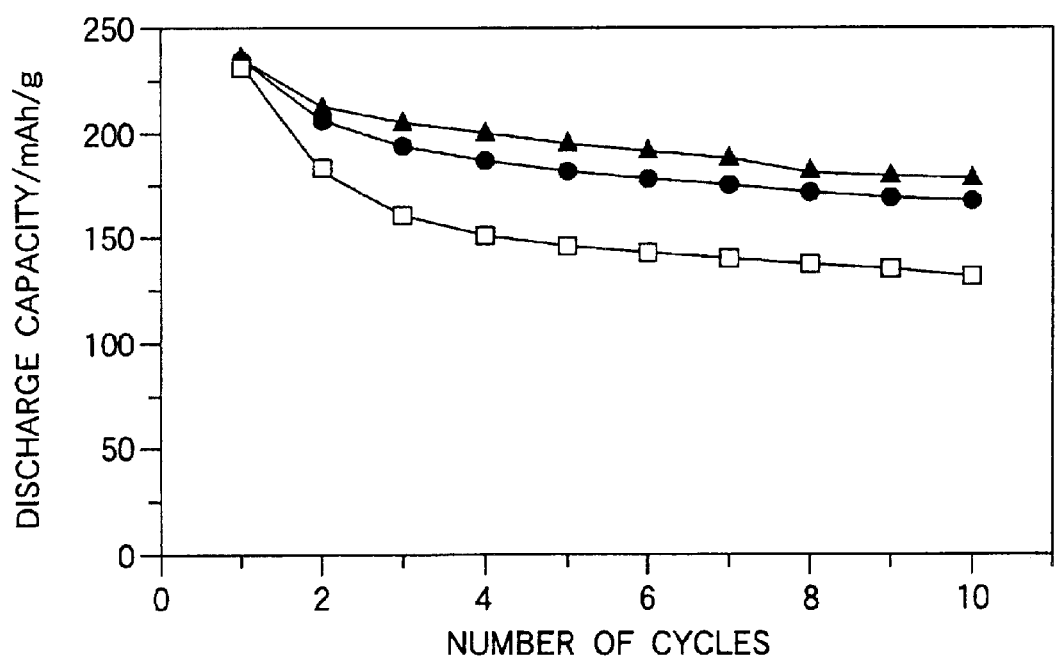
FIG. 6 is a graph illustrating the discharge capacity of the batteries A1 and A2 of the Examples and the comparative battery B1 at each cycle.

FIG. 5 illustrates the initial charge-discharge characteristics of the cells of the Examples and the comparative cells. FIG. 6 illustrates the discharge capacity of the cells of the Examples and the comparative cells at each cycle. In these Figs., the symbols ●, ▲, and □ indicate the characteristics of the cell A1 of the Example, the cell A2 of the Example, and the Comparative cell B1, respectively. The discharge capacity herein is represented by electricity per 1 g of the positive active material (mAh/g).

FIG. 5 illustrates the initial charge-discharge characteristics of the cells of the Examples and the comparative cells. The current was 0.1 $mA/cm^2$. The cells of the Examples exhibit the higher charge and discharge capacities as compared with the comparative cells, indicating that the cells of the Examples provide the better charge-discharge characteristics.

FIG. 6 illustrates the discharge capacity of the cells of the Examples and the comparative cells at each cycle. The current was 0.2 $mA/cm^2$. It was apparent that the cells of the Examples show the better cycle-life performance than the comparative cells.

Figure 7:
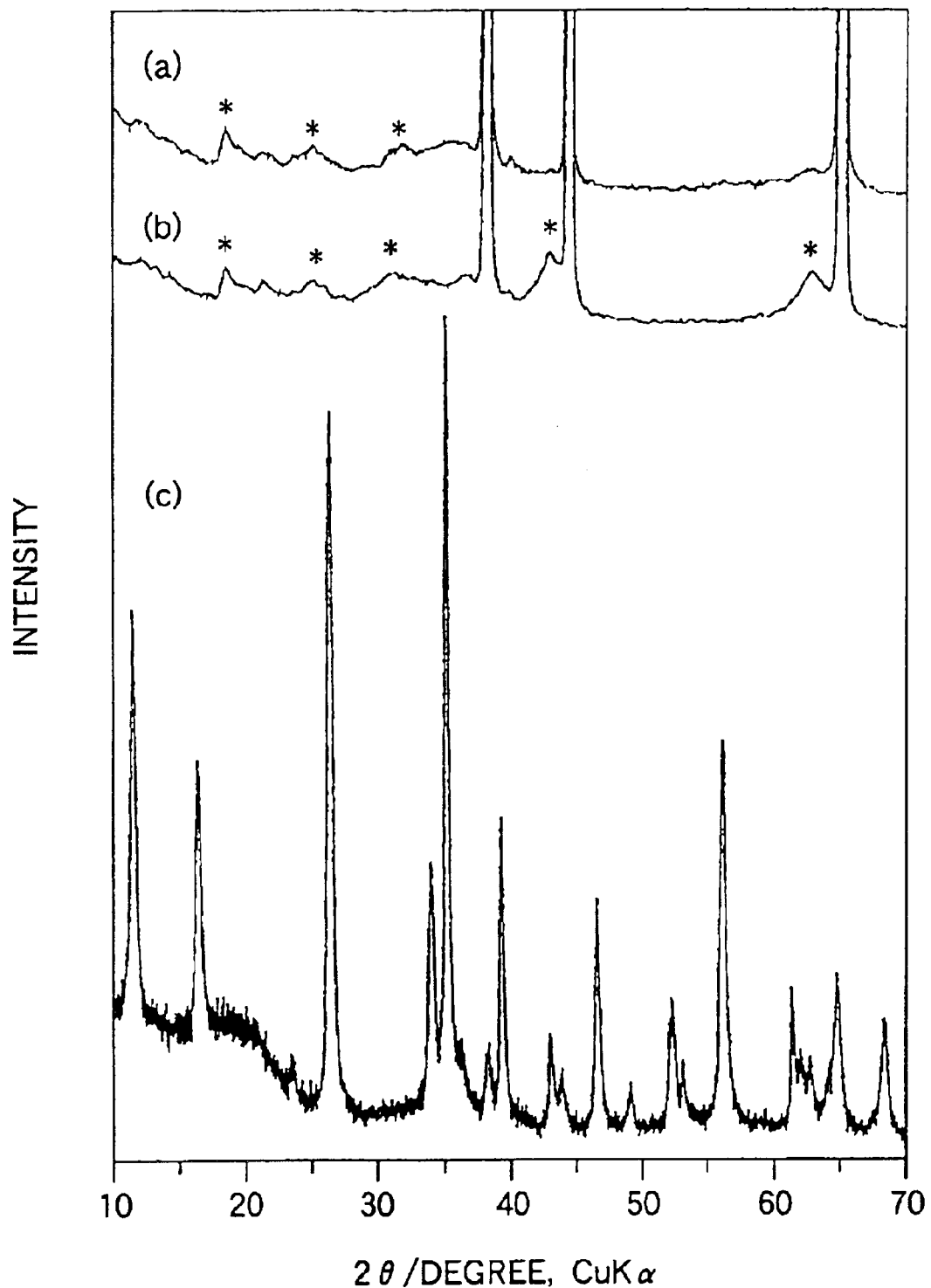
FIG. 7 illustrates X-ray diffraction patterns of the positive active material used in the battery A1 of the Example in the charged state (a), in the discharge state (b) and before charge and discharge (c), wherein the symbol * indicates new diffraction peaks which appear during the charge and discharge.

The cell A1 of the Example was charged at 4.3 V or discharged at 1.6 V, and then disassembled. The positive active material used was then subjected to X-ray diffractometry. The X-ray diffraction patterns of the products after charge and discharge are shown in FIGS. 7A and B, respectively. The X-ray diffraction pattern of the active material used in the cell A1 of the Example before charge and discharge is shown in FIG. 7C. Comparing FIGS. 7A, B with FIG. 7C, it can be seen that, after charge and discharge, the intensity of the diffraction peaks of the active material is remarkably lowered and that new diffraction peaks appear at the angles of about 19°, 26° and 32°. Furthermore, FIG. 7B shows that new diffraction peaks appear at the angles of about 43° and 63° for the cell in the discharged state. From these results, it was found that when an amorphous β-FeOOH is used as a positive active material of the present invention for the secondary lithium cell, the insertion/extraction of lithium occurs, which further lowers the crystallinity of the β-FeOOH and hence causes a drastic change of its structure. The high-intensity peaks observed at the angles of about 38°, 45° and 65° in FIGS. 7A and B are attributed to aluminum used as a current collector.

[EXAMPLE 3]

0.1 mole of $FeCl_3 \cdot 6H_2O$ and 0.1 mole of $CuSO_4 \cdot 5H_2O$ were together dissolved in 1 $dm^3$ of water at a temperature of 25° C. Subsequently, this solution was heated at a rate as low as 10° C./h, and then kept at a temperature of 80° C. for 2 days. The resulting precipitate was filtrated, thoroughly washed with distilled water, and then dried at a temperature of 80° C. to obtain a positive active material of the present invention.

Finally, a positive electrode and a cell (A3) of this Example were prepared in the same manner as in Example 1 except that the amount of the foregoing positive active material, acetylene black and PVdF used were 70 weight percent, 20 weight percent and 10 weight percent, respectively.

[EXAMPLE 4]

A positive active material of the present invention was obtained in the same manner as in Example 3. Subsequently, a positive electrode and a cell (A4) of this Example were prepared in the same manner as in Example 1 except that the amount of the foregoing positive active material, acetylene black and PVdF used were 75 weight percent, 15 weight percent and 10 weight percent, respectively.

[EXAMPLE 5]

A positive active material of the present invention was obtained in the same manner as in Example 3. Subsequently, a positive electrode and a cell (A5) of this Example were prepared in the same manner as in Example 1 except that the amount of the foregoing positive active material, acetylene black and PVdF used were 80 weight percent, 10 weight percent and 10 weight percent, respectively.

[EXAMPLE 6]

0.1 mole of $FeCl_3 \cdot 6H_2O$ and 0.033 mole of $Al_2(SO_4)_3 \cdot 8H_2O$ were together dissolved in 1 $dm^3$ of water at a temperature of 25° C. Subsequently, this solution was heated at a rate as low as 10° C./h, and then kept at a temperature of 80° C. for 2 days. The resulting precipitate was filtered, thoroughly washed with distilled water, and then dried at a temperature of 80° C. to obtain a positive active material of the present invention.

Finally, a positive electrode and a cell (A6) of this Example were prepared in the same manner as in Example 1 except that the amount of the foregoing positive active material, acetylene black and PVdF used were 80 weight percent, 10 weight percent and 10 weight percent, respectively.

[EXAMPLE 7]

0.1 mole of $FeCl_3 \cdot 6H_2O$ and 0.04 mole of $Al_2(SO_4)_3 \cdot 8H_2O$ were together dissolved in 1 $dm^3$ of water at a temperature of 25° C. Subsequently, this solution was heated at a rate as low as 10° C./h, and then kept at a temperature of 80° C. for 2 days. The resulting precipitate was filtered, thoroughly washed with distilled water, and then dried at a temperature of 80° C. to obtain a positive active material of the present invention.

Finally, a positive electrode and a cell (A7) of this Example were prepared in the same manner as in Example 1 except that the amount of the foregoing positive active material, acetylene black and PVdF used were 80 weight percent, 10 weight percent and 10 weight percent, respectively.

[EXAMPLE 8]

0.1 mole of $FeCl_3 \cdot 6H_2O$ and 0.05 mole of $Al_2(SO_4)_3 \cdot 8H_2O$ were together dissolved in 1 $dm^3$ of water at a temperature of 25° C. Subsequently, this solution was heated at a rate as low as 10° C./h, and then kept at a temperature of 85° C. for 2 days. The resulting precipitate was filtered, thoroughly washed with distilled water, and then dried at a temperature of 80° C. to obtain a positive active material of the invention.

Finally, a positive electrode and a cell (A8) of this Example were prepared in the same manner as in Example 1 except that the amount of the foregoing positive active material, acetylene black and PVdF used were 80 weight percent, 10 weight percent and 10 weight percent, respectively.

[COMPARATIVE EXAMPLE 3]

A positive active material was obtained in the same manner as in Comparative Example 1. Subsequently, a positive electrode and a comparative cell (B3) were prepared in the same manner as in Example 1 except that the amount of the foregoing positive active material, acetylene black and PVdF used were 70 weight percent, 20 weight percent and 10 weight percent, respectively.

[COMPARATIVE EXAMPLE 4]

A positive active material was obtained in the same manner as in Comparative Example 1. Subsequently, a positive electrode and a comparative cell (B4) were prepared in the same manner as in Example 1 except that the amount of the foregoing positive active material, acetylene black and PVdF used were 75 weight percent, 15 weight percent and 10 weight percent, respectively.

[COMPARATIVE EXAMPLE 5]

A positive active material was obtained in the same manner as in Comparative Example 1. Subsequently, a positive electrode and a comparative cell (B5) were prepared in the same manner as in Example 1 except that the amount of the foregoing positive active material, acetylene black and PVdF used were 80 weight percent, 10 weight percent and 10 weight percent, respectively.

[COMPARATIVE EXAMPLE 6]

0.1 mole of $FeCl_3 \cdot 6H_2O$ and 0.02 mole of $Al_2(SO_4)_3 \cdot 8H_2O$ were together dissolved in 1 $dm^3$ of water at a temperature of 25° C. Subsequently, this solution was heated at a rate as low as 10° C./h, and then kept at a temperature of 80° C. for 2 days. The resulting precipitate was filtered, thoroughly washed with distilled water, and then dried at a temperature of 80° C. to obtain a positive action material.

Finally, a positive electrode and a comparative cell (B6) were prepared in the same manner as in Example 1 except that the amount of the foregoing positive active material, acetylene black and PVdF used were 80 weight percent, 10 weight percent and 10 weight percent, respectively.

[COMPARATIVE EXAMPLE 7]

0.1 mole of $FeCl_3 \cdot 6H_2O$ and 0.025 mole of $Al_2(SO_4)_3 \cdot 8H_2O$ were together dissolved in 1 $dm^3$ of water at a temperature of 25° C. Subsequently, this solution was heated at a rate as low as 10° C./h, and then kept at a temperature of 80° C. for 2 days. The resulting precipitate was filtered, thoroughly washed with distilled water, and then dried at a temperature of 80° C. to obtain a positive active material.

Finally, a positive electrode and a comparative cell (B7) were prepared in the same manner as in Example 1 except that the amount of the foregoing positive active material, acetylene black and PVdF used were 80 weight percent, 10 weight percent and 10 weight percent, respectively.

Figure 8:
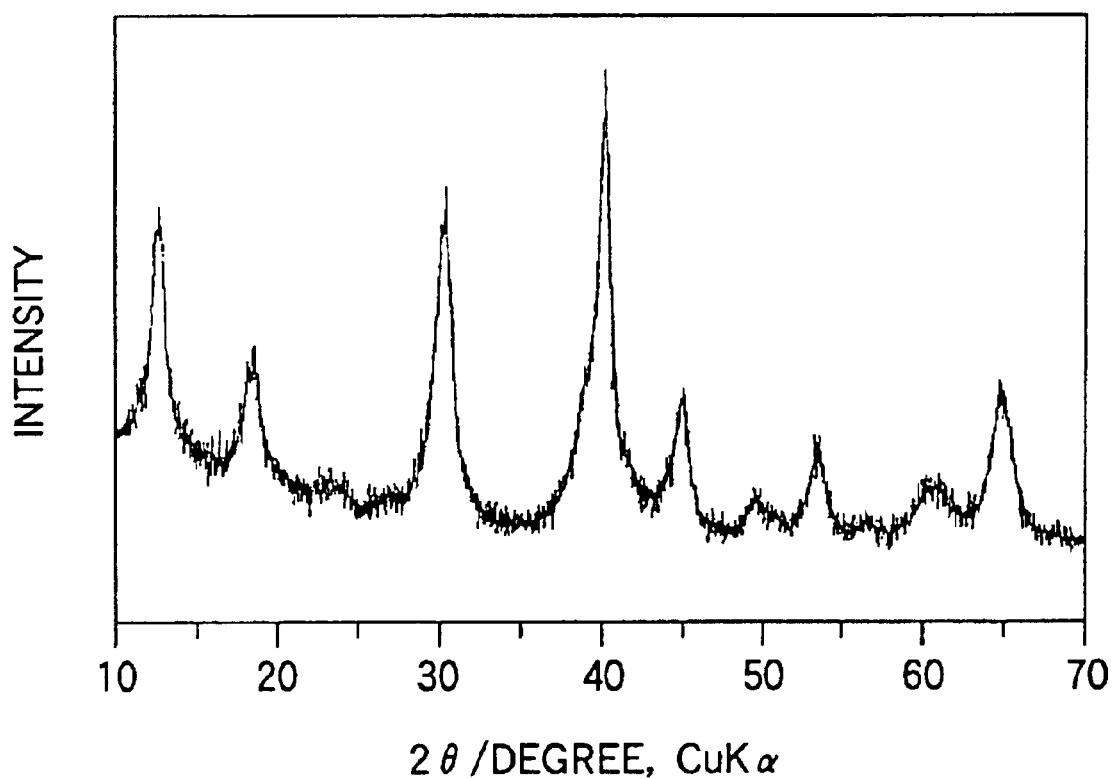
FIG. 8 illustrates a X-ray diffraction pattern of the positive active material used in the battery A3 of the Example.

FIG. 8 shows the X-ray diffraction pattern (the CuKα ray) of the positive active material used in the cell A3 of the Example. From the position of the diffraction peaks in FIG. 6, the active material used in the cell A3 of the Example was found to be β-FeOOH. The half width of the diffraction peak from the (110) plane for the active material used in the cell A3 was about 0.7°. These results indicate that the positive active material used in the cell A3 of the Example was an amorphous β-FeOOH. As previously mentioned, the active material used in the comparative cell B3 is a high-crystalline β-FeOOH.

The lattice constants of the tetragonal β-FeOOH determined from the position of the X-ray diffraction peaks were a=10.50 Å and c=3.03 Å for the amorphous β-FeOOH used in the cell A3 of the Example, and a=10.54 Å and c=3.03 Å for the high-crystalline β-FeOOH. It was thus found that the unit cell of the amorphous β-FeOOH of the present invention has shrunk in the direction of the a-axis as compared with that of the high-crystalline one.

Figure 9:
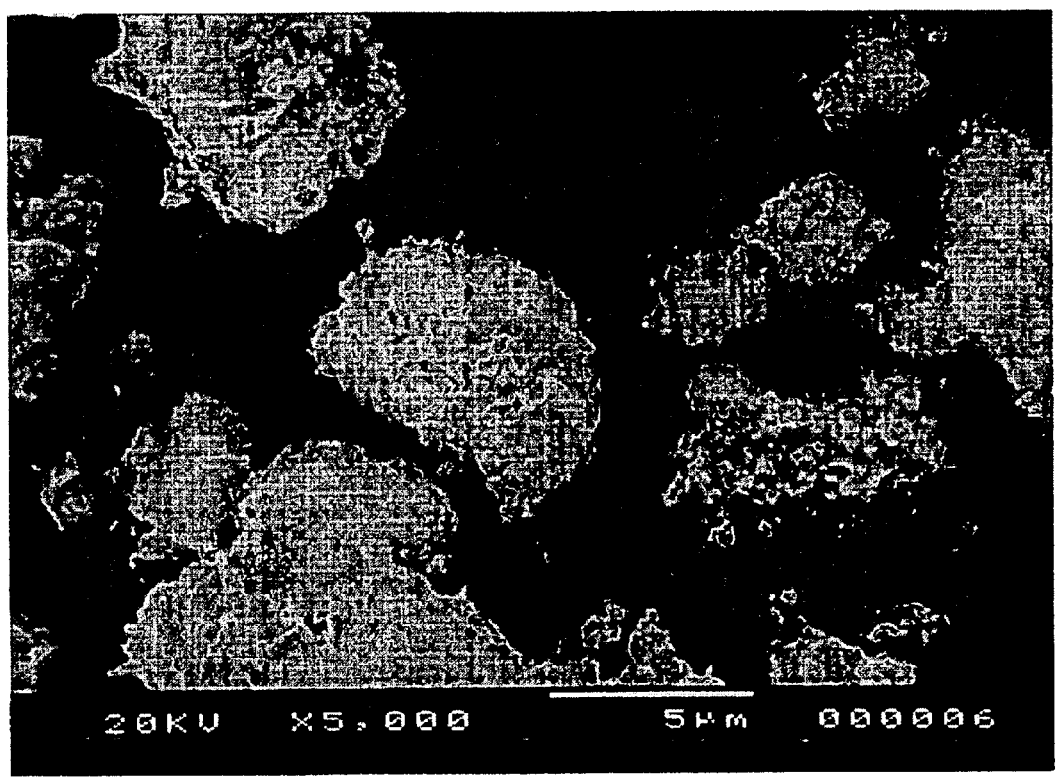
FIG. 9 is a scanning electron microphotograph of the positive active material used in the battery A3 of the Example.

FIG. 9 illustrates the scanning electron microphotograph of the positive active material used in the cell A3 of the Example. The active material used in the cell A3 of the Example was found to comprise particles having an average diameter of about 4 μm and an aspect ratio of not greater than 2. On the other hand, the active material used in the comparative cell B3 was found to comprise needle-like particles having an aspect ratio of about 8; the length of a longer axis was about 0.8 μm and that of a shorter axis was about 0.1 μm.

The ICP spectroscopy confirmed that β-FeOOH used in the cell A3 of the Example contained 0.07 wt % of Cu.

The cell A3 of the Example was charged, discharged, disassembled, and then subjected to the X-ray diffractometry of the positive active material in the same manner as the cell A1 of the Example. The resulting products after charge and discharge showed the X-ray diffraction patterns similar to those shown in FIGS. 7A and B, respectively.

[CHARGE-DISCHARGE CHARACTERISTICS]

The cells A3, A4 and A5 of the Examples and the comparative cells B3, B4 and B5 thus prepared were each then subjected to the 10-cycle charge-discharge test with a constant current. The termination voltages for the charge and discharge were 4.3 V and 1.6 V, respectively. The current was 0.2 mZ/cm².

Figure 10:
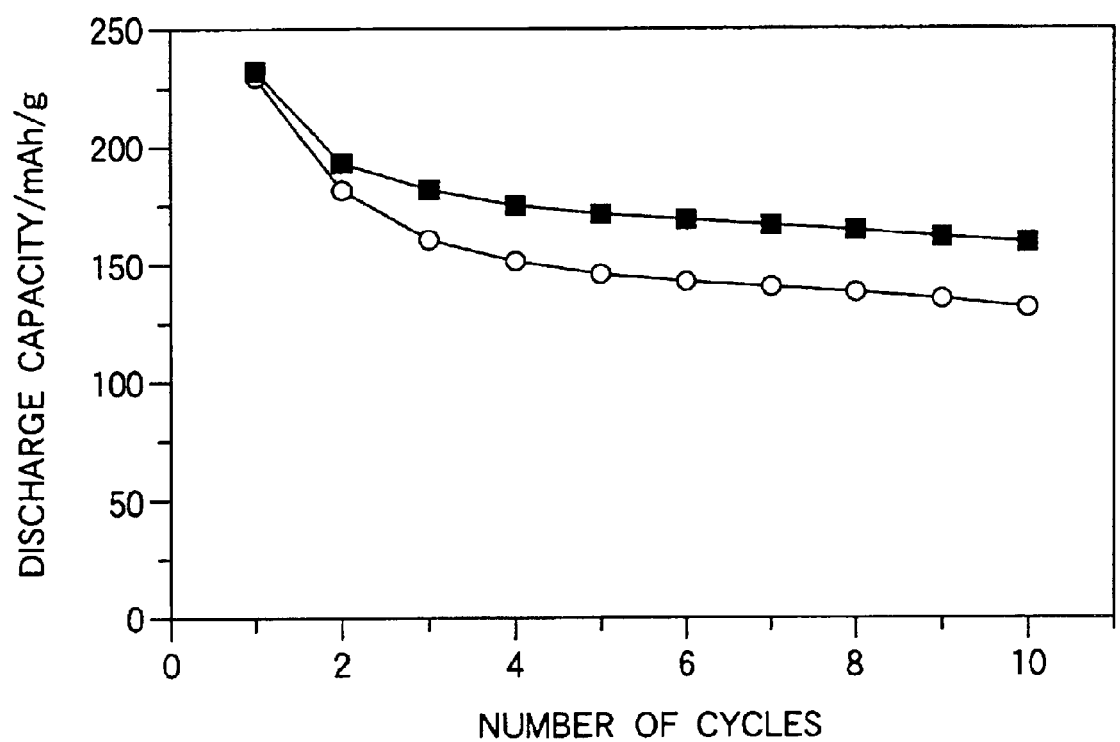
FIG. 10 is a graph illustrating the discharge capacity of the battery A3 of the Example and the comparative battery B1 at each cycle.

FIG. 10 illustrates the discharge capacities of the cell A3 of the Example and the comparative cell B3 at each cycle. In FIG. 10, the symbols ■ and ○ indicate the discharge capacities of the cell A1 of the Example and the comparative cell B3 at each cycle, respectively. From FIG. 10, it was found that the cell of the Example shows better cycle-life performance than the comparative cell.

Figure 11:
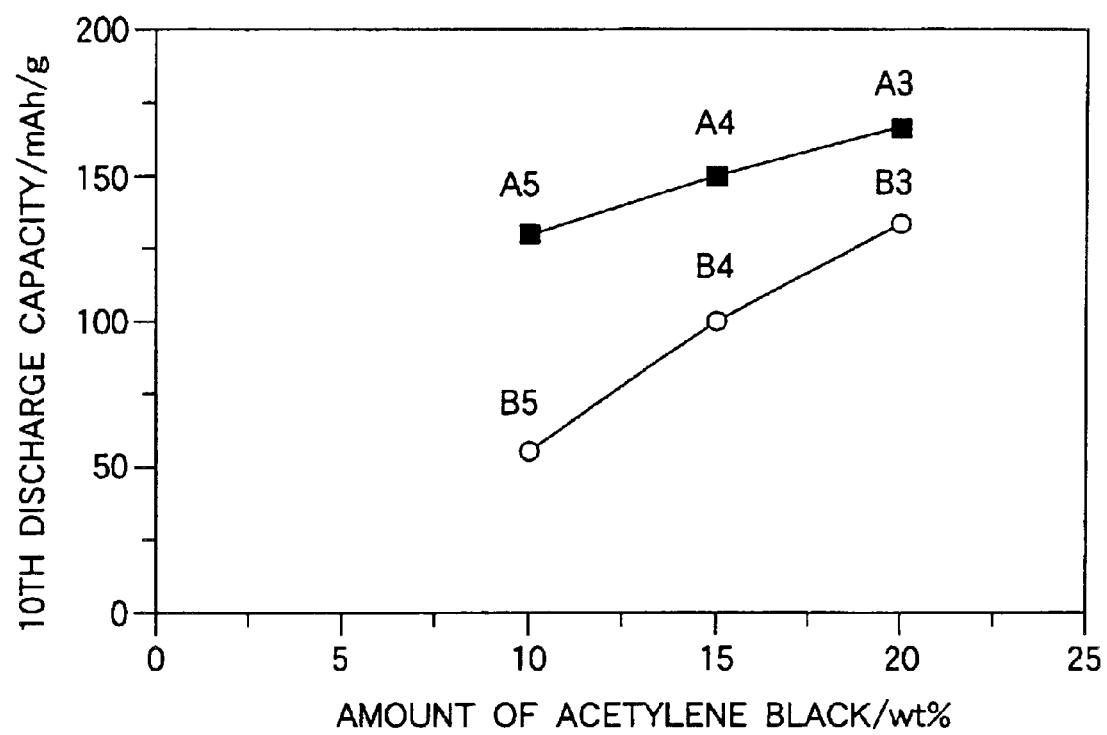
FIG. 11 is a graph illustrating the relationship between the amount of the electrically-conducting agent and the discharge capacity at the 10th cycle.

FIG. 11 illustrates the relationship between the amount of acetylene black added as an electrically-conducting agent and the discharge capacity at the 10th cycle for the cells A3, A4 and A5 of the Examples and the comparative cells B3, B4 and B5. In FIG. 11, the symbol ■ indicates the values for the cells A3, A4 and A5 of the Examples and the symbol ○ indicates those for the comparative cells B3, B4 and B5. From FIG. 11, it was found that the cells of the Examples give a higher discharge capacity than the comparative cells even if the amount of the electrically-conducting agent in the positive electrode is small.

Subsequently, β-FeOOH having different aspect ratios were used to prepare cells similar to that used in the Example 3. The prepared cells were then subjected to the charge-discharge cycling test in the same manner as in Example 3. The 10th discharge capacities are shown in Table 1. The values of the discharge capacities in Table 1 were averaged ones calculated from the 10 cells.

TABLE 1

| Aspect ratio | Discharge capacity (mAh/g) |
|---|---|
| 1.5 | 165 |
| 1.9 | 161 |
| 2.8 | 154 |
| 3.5 | 152 |

TABLE 1-continued

| Aspect ratio | Discharge capacity (mAh/g) |
|---|---|
| 4.6 | 151 |
| 5.9 | 142 |
| 6.4 | 138 |
| 7.9 | 133 |

As is clearly seen in Table 1, the aspect ratio of β-FeOOH which is not greater than 5 showed the discharge capacity over 150 mAg/g. In particular, when the aspect ratio of β-FeOOH is not greater than 2, the discharge capacity exceeds 160 mAg/g.

When subjected to the ICP spectroscopy, the active materials used in the cells A6, A7 and A8 of the Examples and the comparative cells B6 and B7 were found to contain A1. Then, the relationship between the amount of A1 and the charge-discharge characteristics was examined. Scanning electron microscopy confirmed that the active materials used in the cells A6, A7 and A8 of the Examples and the comparative cells B6 and B7 had an aspect ratio of not greater than 5.

Figure 12:
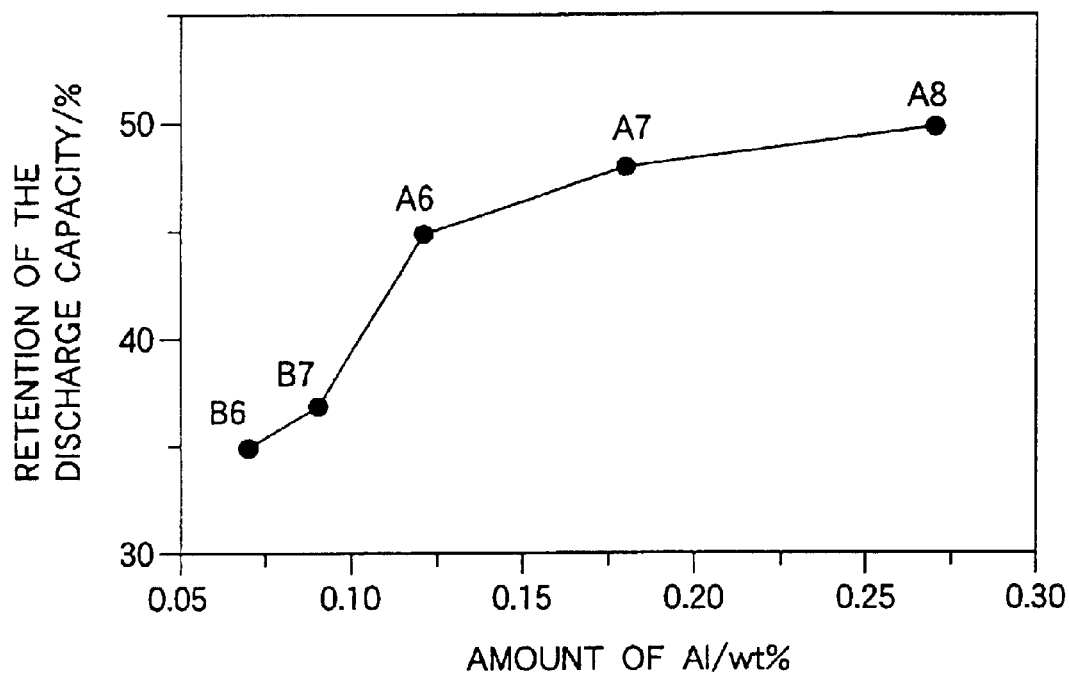
FIG. 12 is a graph illustrating the relationship between the retention of the discharge capacity and the amount of Al in the particle of the positive active material.

FIG. 12 illustrates the relationship between the retention of the discharge capacities of the cells A6, A7 and A8 of the Examples and the comparative cells B6 and B7 at the 10th cycle and the amount of A1 in the active materials used in these cells. The "retention of the discharge capacity" is defined by the ratio of the discharge capacity at the 10th cycle to the initial discharge capacity. The value of the retention is shown by percentage. It is clearly seen that, when the amount of the A1 in the active material is not smaller than 0.1 wt %, the resulting cells show a remarkably high retention of the discharge capacity.

The cell A3 of the Example was charged at 4.3 V or discharged at 1.6 V, and then disassembled. The positive active material used was then subjected to X-ray diffractometry. The resulting products after charge and discharge showed the X-ray diffraction patterns similar to those shown in FIGS. 7A and B. This result indicates that when an amorphous β-FeOOH of the present invention having a particle with an aspect ratio of not greater than 5 is used as a positive active material for the secondary lithium cell, the insertion/extraction of lithium occurs, which further lowers the crystallinity of β-FeOOH and hence causes a drastic change of its structure.

[EXAMPLE 9]

0.1 mole of $FeCl_3 \cdot 6H_2O$ and 0.0033 mole of $Li_2SO_4 \cdot H_2O$ were together dissolved in 1 dm³ of water at a temperature of 25° C. Subsequently, this solution was heated at a rate as low as 10° C./h, and then kept at a temperature of 60° C. for 2 days. The resulting precipitate filtrated, thoroughly washed with distilled water, and then dried at a temperature of 80 C. to obtain a positive active material of the present invention.

Finally, a positive electrode and a cell (A9) of this Example were prepared in the same manner as in Example 1 except that the amount of the foregoing positive active material, acetylene black and PVdF used were 80 weight percent, 10 weight percent and 10 weight percent, respectively.

[EXAMPLE 10]

0.1 mole of $FeCl_3 \cdot 6H_2O$ and 0.05 mole of $Li_2SO_4 \cdot H_2O$ were together dissolved in 1 dm³ of water at a temperature of 25° C. Subsequently, this solution was heated at a rate as low as 10° C./h, and then kept at a temperature of 70° C. for 2 days. The resulting precipitate was filtrated, thoroughly washed with distilled water, and then dried at a temperature of 80° C. to obtain a positive active material of the present invention.

Finally, a positive electrode and a cell (A10) of this Example were prepared in the same manner as in Example 1 except that the amount of the foregoing positive active material, acetylene black and PVdF used were 80 weight percent, 10 weight percent and 10 weight percent, respectively.

[EXAMPLE 11]

0.1 mole of $FeCl_3 \cdot 6H_2O$ and 0.1 mole of $Li_2SO_4 \cdot H_2O$ were together dissolved in 1 $dm^3$ of water at a temperature of 25° C. Subsequently, this solution was heated at a rate as low as 10° C./h, and then kept at a temperature of 90° C. for 2 days. The resulting precipitate was filtrated, thoroughly washed with distilled water, and then dried at a temperature of 80° C. to obtain a positive active material of the present invention.

Finally, a positive electrode and a cell (A11) of this Example were prepared in the same manner as in Example 1 except that the amount of the foregoing positive active material, acetylene black and PVdF used were 80 weight percent, 10 weight percent and 10 weight percent, respectively.

[EXAMPLE 12]

0.1 mole of $FeCl_3 \cdot 6H_2O$ and 0.01 mole of $MgSO_4 \cdot 7H_2O$ were together dissolved in 1 $dm^3$ of water at a temperature of 25° C. Subsequently, this solution was heated at a rate as low as 10° C./h, and then kept at a temperature of 60° C. for 2 days. The resulting precipitate was filtrated, thoroughly washed with distilled water, and then dried at a temperature of 80° C. to obtain a positive active material of the present invention.

Finally, a positive electrode and a cell (A12) of this Example were prepared in the same manner as in Example 1 except that the amount of the foregoing positive active material, acetylene black and PVdF used were 80 weight percent, 10 weight percent and 10 weight percent, respectively.

[EXAMPLE 13]

0.1 mole of $FeCl_3 \cdot 6H_2O$ and 0.033 mole of $Li_2SO_4 \cdot H_2O$ were together dissolved in 1 $dm^3$ of water at a temperature of 25° C. Subsequently, this solution was heated at a rate as low as 10° C./h, and then kept at a temperature of 60° C. for 2 days. The resulting precipitate was filtrated, thoroughly washed with distilled water, and then dried at a temperature of 80° C. to obtain a positive active material of the present invention.

Finally, a positive electrode and a cell (A13) of this Example were prepared in the same manner as in Example 1 except that the amount of the foregoing positive active material, acetylene black and PVdF used were 80 weight percent, 10 weight percent and 10 weight percent, respectively.

[COMPARATIVE EXAMPLE 8]

0.1 mole of $FeCl_3 \cdot 6H_2O$ and 0.3 mole of $CuSO_4 \cdot 5H_2O$ were together dissolved in 1 $dm^3$ of water at a temperature of 25° C. Subsequently, this solution was heated at a rate as low as 10° C./h, and then kept at a temperature of 60° C. for 2 days. The resulting precipitate was filtrated, thoroughly washed with distilled water, and then dried at a temperature of 80° C. to obtain a positive active material.

Finally, a positive electrode and a comparative cell (B8) were prepared in the same manner as in Example 1 except that the amount of the foregoing positive active material, acetylene black and PVdF used were 80 weight percent, 10 weight percent and 10 weight percent, respectively.

[COMPARATIVE EXAMPLE 9]

A positive active material of the present invention was obtained in the same manner as in Example 9. Subsequently, a positive electrode and a comparative cell (B9) were prepared in the same manner as in Example 1 except that the amount of the foregoing positive active material, acetylene black and PVdF used were 70 weight percent, 20 weight percent and 10 weight percent, respectively.

[COMPARATIVE EXAMPLE 10]

A positive active material of the present invention was obtained in the same manner as in Example 10. Subsequently, a positive electrode and a comparative cell (B10) were prepared in the same manner as in Example 1 except that the amount of the foregoing positive active material, acetylene black and PVdF used were 70 weight percent, 20 weight percent and 10 weight percent, respectively.

The positive active materials used in the cells A9 to A13 of the Examples and those used in the comparative cells B8 to B10 showed X-ray diffraction patterns similar to that shown in FIG. 8. This result indicates that the active materials used in the cells A9 to A13 of the Examples and those used in the comparative cells B8 to B10 were all amorphous $\beta$-FeOOH.

Table 2 shows the mode diameter of the positive active materials determined by the particle-size analysis for the cells A9 to A13 of the Examples and the comparative cell B8.

TABLE 2

| Cell No. | Mode diameter of particle ($\mu$m) |
|---|---|
| A9 | 0.6 |
| A10 | 3.4 |
| A11 | 5.1 |
| A12 | 6.2 |
| A13 | 9.5 |
| B8 | 13.9 |

As can be seen in Table 2, all the particles of the active materials used in the cells A9 to A13 of the Examples had a mode diameter of not greater than 10 $\mu$m. SEM observation confirmed that the active material used in the cell A9 of the Example was mainly composed of primary particles and that those used in the cells A10 to A13 of the Examples were found to be mainly composed of agglomerates of primary particles.

[CHARGE-DISCHARGE CHARACTERISTICS]

The cells A9 to A13 of the Examples and the comparative cells B8 to B10 thus prepared were then subjected to the 10-cycle charge-discharge test with a constant current. The termination voltages for the charge and discharge were 4.3 V and 1.6 V, respectively. The current was 0.2 $mA/cm^2$. The measurement was conducted at a temperature of 25° C.

Figure 13:
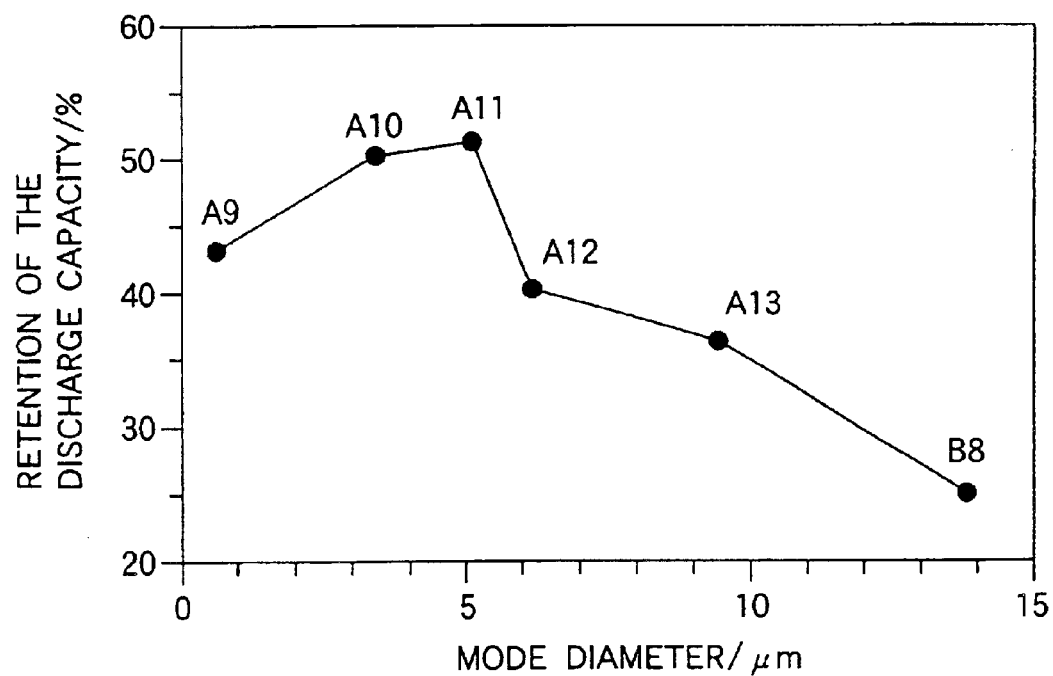
FIG. 13 is a graph illustrating the relationship between the retention of the discharge capacity and the mode diameter of the particle of the positive active material.

FIG. 13 illustrates the relationship between the retention of the 10th discharge capacities of the cells A9 to A13 of the Examples and the comparative cells B8 and the mode diameter of the particles of the positive active materials used in these cells.

As can be seen in FIG. 13, when the mode diameter of the particle of the active material is not greater than 10 μm, particularly not greater than 6 μm, the resulting cell exhibits a remarkably high retention of the discharge capacity.

From the particle-size analysis, the active materials used in the cells A6, A7 and A8 of the Examples and those used in the comparative cells B6 and B7 were found to have particles with a mode diameter of from 3 μm to 5 μm. Accordingly, taking into account the relationship shown in FIG. 12, it was clarified that when an amorphous β-FeOOH, which has a mode diameter of not greater than 10 μm and the amount of Al of not smaller than 0.1 wt %, is used as a positive active material, the resulting cell shows a remarkably high retention of the discharge capacity.

In the Examples 9 to 13, the active material, acetylene black and PVdF was mixed with a ratio of 80:10:10 in weight. Subsequently, the effect of the amount of the electrically-conducting agent on the charge-discharge characteristics was examined. The comparative cells B9 and B10 containing the active material, acetylene black, and PVdF with a weight ratio of 70:20:10 were subjected to the charge-discharge test. The results were then compared with those of the cells A9 and A10 of the Examples. As a result, the retentions of the 10th discharge capacities were similar between the comparative cells B9 and B10. On the other hand, when the amount of the electrically-conducting agent is 10 wt %, the cell A10 of the Example showed a higher retention of the discharge capacity than the cell A9 of the Example as shown in FIG. 13. The active material used in the cell A9 of the Example is mainly composed of primary particles while the active material used in the cell A10 of the Example is mainly composed of agglomerates. From these facts, it was found that when an agglomerate is used as an active material, a high discharge capacity can be retained even if the amount of the electrically-conducting agent is reduced.

In the present Examples, metallic lithium was used as a negative electrode material. When a compound comprising a positive active material of the present invention which contains lithium is used as a positive active material, graphite, amorphous carbon, oxide, nitride, lithium alloy or the like may be used as a negative electrode material. As a method to insert lithium in the active material of the present invention, there may be exemplified a chemical process besides the electrochemical process described in the foregoing Examples. An example of the chemical process includes a method involving the reaction of the active material of the invention with a reducing agent such as n-BuLi and LiI.

Industrial Possibility

As mentioned above, in accordance with the invention, the use of an unknown novel iron compound as a positive active material makes it possible to provide an inexpensive and environmentally friendly non-aqueous secondary battery.

What is claimed is:

1. A positive active material for a secondary battery comprising β-FeOOH that contains at least one element selected from the group consisting of P, S, Li, Na, K, Sc, Ti, V, Cr, Mn, Zr, Pb and Sn and that shows a diffraction peak of (110) plane of which half width is greater than 0.3° (2θ) when subjected to X-ray diffractometry with the CuKα ray and if Li is contained in the β-FeOOH, the Li is incorporated into the β-FeOOH in advance of insertion/extraction of lithium.

2. A process for the preparation of a positive active material for a secondary battery according to claim 1 which comprises a step of hydrolyzing an aqueous solution, in which an iron salt and a salt containing at least one element selected from the group consisting of P, S, Li, Na, K, Sc, Ti, V, Cr, Mn, Zr, Pb and Sn are dissolved, at a temperature of from 40° C. to 100° C.

3. A process for the preparation of a positive active material for a secondary battery according to claim 2, wherein said iron salt is ferric chloride, said vanadium salt is $VOSO_4$, and said aqueous solution contains $FeCl_3$ and $VOSO_4$ together dissolved therein at a molar ratio satisfying $0<(VOSO_4/FeCl_3)<0.1$.

4. A positive active material for a secondary battery comprising β-FeOOH according to claim 1 that has particles with an aspect ratio of not greater than 5.

5. A positive active material for a secondary battery comprising β-FeOOH according to claim 1 that has particles with a mode diameter of not greater than 10 μm.

6. A positive active material for a secondary battery according to claim 4 or 5, wherein the amount of said at least one element selected from the group consisting of Li, Na, K, Sc, Ti, V, Cr, Mn, Zr, Pb and Sn is not smaller than 0.1 wt %.

7. A process for the preparation of a positive active material according to claim 4 or 5, which comprises a step of hydrolyzing an aqueous solution, in which ferric chloride and a salt containing at least one element selected from the group consisting of Li, Na, K, Sc, Ti, V, Cr, Mn, Zr, Pb and Sn are dissolved, at a temperature of from 40° C. to 100° C.

8. A non-aqueous electrolyte secondary battery comprising the following elements:

(1) a negative electrode comprising a negative active material capable of inserting and extracting lithium ion and/or metallic lithium;

(2) a positive electrode comprising a positive active material according to any one of claim 1, 4, or 5; and (3) an electrolyte in contact with said negative electrode and positive electrode.

9. A positive active material for a secondary battery according to claim 1, comprising β-FeOOH that contains at least one element selected from the group consisting of P, S, Li, Na, K, Sc, Ti, V, Cr, Mn, Zr, Pb, and Sn and that shows a diffraction peak of (110) plane of which half width is greater than 0.5° (2θ) when subjected to X-ray diffractometry with the CuKα ray.

* * * * *